United States Patent
Park et al.

(10) Patent No.: US 9,994,454 B2
(45) Date of Patent: *Jun. 12, 2018

(54) POROUS SILICON DIOXIDE-CARBON COMPOSITE AND METHOD FOR PREPARING HIGH-PURITY GRANULAR BETA-PHASE SILICON CARBIDE POWDER WITH USING THE SAME

(71) Applicant: KOREA INSTITUTE OF SCIENCE AND TECHNOLOGY, Seoul (KR)

(72) Inventors: Sang Whan Park, Seoul (KR); Mi Rae Youm, Seoul (KR); Sung Il Youn, Seoul (KR); Gyoung Sun Cho, Guri-si (KR)

(73) Assignee: Korea Institute of Science and Technology, Seoul (KR)

( * ) Notice: Subject to any disclaimer, the term of this patent is extended or adjusted under 35 U.S.C. 154(b) by 222 days.

This patent is subject to a terminal disclaimer.

(21) Appl. No.: 15/075,751

(22) Filed: Mar. 21, 2016

(65) Prior Publication Data

US 2017/0081197 A1 Mar. 23, 2017

(30) Foreign Application Priority Data

Sep. 21, 2015 (KR) .................... 10-2015-0132850

(51) Int. Cl.
*C01B 31/36* (2006.01)
*C01B 32/956* (2017.01)

(52) U.S. Cl.
CPC ............ *C01B 31/36* (2013.01); *C01B 32/956* (2017.08)

(58) Field of Classification Search
CPC .............................. C01B 31/36; C01B 32/956
See application file for complete search history.

(56) References Cited

U.S. PATENT DOCUMENTS 9,487,405 B2 * 11/2016 Park ...................... C01B 32/956

FOREIGN PATENT DOCUMENTS

| JP | 2581106 B2 | | 11/1996 |
|---|---|---|---|
| KR | 10-0338849 | * | 11/2002 |
| KR | 10-0338849 B1 | | 11/2002 |
| KR | 10-1084711 | * | 11/2011 |
| KR | 10-1084711 B1 | | 11/2011 |
| KR | 10-1116755 | * | 2/2012 |
| KR | 10-1116755 B1 | | 2/2012 |
| KR | 10-2014-0049664 | * | 4/2014 |
| KR | 10-2014-0049664 A | | 4/2014 |
| KR | 10-1413653 B1 | | 7/2014 |

OTHER PUBLICATIONS

Jo, et al. "The Effects of Metallic Silicon on the Synthsis of β-SiC Powders by A Carbothermal Reduction Using SiO2—C Hybrid Precursor Fabricated by a Sol-gel Process" Journal of the Korean Ceramic Society, vol. 50, No. 6, 402-409 (2013).

* cited by examiner

*Primary Examiner* — Leszek Kiliman
(74) *Attorney, Agent, or Firm* — NSIP Law (57) ABSTRACT

The present disclosure relates to porous silicon dioxide-carbon composites and a method for preparing high-purity β-phase silicon carbide granular powders using the same. More particularly, it relates to a method for preparing high-purity β-phase silicon carbide granular powders in accordance with a first step of preparing gel wherein carbon compounds are uniformly dispersed in silicon dioxide network structures generated by a sol-gel process using a silicon compound and a carbon compound in a liquid state as raw materials, a second step of preparing porous silicon dioxide-carbon composites, in which the carbon compounds are solidified, dried and then thermally treated to have a high specific area, and a third step of conducting both of a direct reaction between carbon and metallic silicon and a carbothermal reduction between carbon and silicon dioxide through a two-step treatment process of the prepared porous silicon dioxide-carbon composites powders with the added metallic silicon, wherein the average particle size, particle size distribution and purity of the silicon carbide powder can be adjusted by controlling a heating rate, a heat treatment temperature and time during the heat treatment process.

13 Claims, 2 Drawing Sheets

POROUS SILICON DIOXIDE-CARBON COMPOSITE AND METHOD FOR PREPARING HIGH-PURITY GRANULAR BETA-PHASE SILICON CARBIDE POWDER WITH USING THE SAME

CROSS-REFERENCE TO RELATED APPLICATIONS

This application claims, under 35 U.S.C. § 119, the priority of Korean Patent Application No. 10-2015-0132850, filed on Sep. 21, 2015, in the Korean Intellectual Property Office, the disclosure of which is incorporated herein by reference in its entirety.

BACKGROUND (a) Technical Field

The present disclosure relates to porous silicon dioxide-carbon composites and a method for preparing high-purity β-phase silicon carbide granular powders using the same. More particularly, it relates to a method for preparing high-purity β-phase silicon carbide granular powders in accordance with a first step of preparing gel wherein carbon compounds are uniformly dispersed in silicon dioxide network structures generated by a sol-gel process using a silicon compound and a carbon compound in a liquid state as raw materials, a second step of preparing porous silicon dioxide-carbon composites, in which the carbon compounds are solidified, dried and then thermally treated to have a high surface area, and a third step of conducting both of a direct reaction between carbon and metallic silicon and a carbothermal reduction between carbon and silicon dioxide at the same time through a two-step heat treatment process of the prepared porous silicon dioxide-carbon composites mixed with the added metallic silicon, wherein the average particle size, particle size distribution and purity of the silicon carbide powder can be adjusted through control of a heating rate, a heat treatment temperature and time during the heat treatment process.

(b) Background Art

Silicon carbide (SiC) is a non-oxide-based ceramic material with superior thermomechanical properties such as high-temperature stability, thermal shock property, etc. and corrosion resistance and chemical resistance, and has been used in various industrial applications requiring corrosion resistance as well as high temperature strength. Recently, silicon carbide has been widely applied to the high-technology industries requiring high performance at high temperature under various sever environments such as LED and semiconductor manufacturing process.

Furthermore, comparing with silicon (Si), silicon carbide has a 10 times wider band gap, 3 times higher thermal conductivity and 10 times higher critical field. Accordingly, silicon carbide is used as a wide band-gap semiconductor material along with GaN, ZnO, AlN, etc. Since silicon carbide is chemically stable and strongly resistant to radiation, it is suitable for the manufacturing of semiconductor devices operating under harsh environments. Also, due to superior thermal conductivity, it is used as a substrate for a vertical LED device. Besides, it is the best suited material for high-output, low-loss power semiconductor devices and power semiconductor devices for high-temperature applications. Therefore, it is expected that silicon carbide will replace silicon (Si) in power conversion semiconductor devices with increasing the market of electrical vehicles.

Various methods have been developed to prepare silicon carbide single crystals for power semiconductors. At present, 6-inch silicon carbide wafers manufactured by the physical vapor transport (PVT) method are commercially available. Because the preparation of silicon carbide single crystals with controlled defects is very difficult compared to other ceramic single crystals growth, they are not mass-produced at low fabrication cost on the market. However, when electric vehicles are mass-produced, a silicon carbide powder semiconductor is expected to take a large part in the semiconductor market. For the growth of silicon carbide single crystals by the PVT method, a high-purity granular silicon carbide powder is necessary for starting materials. However, the open market for the high-purity granular silicon carbide powder has not been established yet.

In the methods reported to date, silicon carbide powders have been prepared using various silicon sources and carbon sources in solid, liquid or gas state. The Acheson method is widely used as a representative method for preparing a silicon carbide powder. The Acheson method is advantageous in that silicon carbide powders can be prepared economically in large amount or large scale because the fabrication process is simple and uses low-cost starting materials. However, the prepared silicon carbide by the Acheson process has a purity of 99.99% or lower and extra processes for the fabrication of silicon carbide powders are necessary because the silicon carbide ingot is prepared by the Acheson process. However, since impurities can be included during the fabrication processes for silicon carbide powders, extra purification processes such as acid cleaning are necessary. Accordingly, the silicon carbide powders prepared by the Acheson process have a limitation to be used for preparing silicon carbide single crystals as a raw material due to low purity.

Also, methods for preparing high-purity granular silicon carbide powders using various silicon sources and carbon sources have been developed. As a specific example of a method for preparing high-purity silicon carbide powders using liquid-state silicon sources and liquid-state carbon sources, silicon dioxide-carbon precursors are prepared using liquid-state silicon compounds such as ethyl silicate, a silicon alkoxide or silane and liquid-state carbon compounds such as a phenol resin, a xylene resin, etc. and then high-purity granular silicon carbide having a size ranging from 100 μm to several millimeters or greater are prepared by conducting the carbothermal reduction at high temperatures of 2100° C. or higher under vacuum atmosphere or inert gas atmosphere such as argon (Ar). As a specific example of a method for preparing high-purity silicon carbide powders using solid-state silicon sources and solid-state carbon sources, ultrahigh-purity granular silicon carbide powders containing nitrogen, boron and aluminum at extremely low concentrations is prepared by heating a solid silicon powder and a solid carbon powder at 1200° C. for 12 hours and then heating at 2250° C. for 1-2 hours under vacuum atmosphere maintaining pressure at $10^{-5}$ torr or below. The method of preparing high purity silicon carbide powders using solid-state raw materials is advantageous in that silicon carbide single crystals with low defect concentration and high insulating property can be prepared. But, it is not applicable to the large-scale production at low fabrication cost because of the high cost of preparing the silicon carbide powders at very high temperature under high vacuum atmosphere.

Korean Patent Registration No. 10-0338849 (patent document 1) proposes a method of preparing high-purity silicon carbide powders by two step heat treatments. First of all, silicon carbide powders are synthesized by heat treating the thermal hardened mixture consisting of a silicon source selected from a tetraalkoxysilane and a tetraalkoxysilane polymer and a carbon source such as a novolac-type phenol resin at 500-1000° C. under a non-oxidizing atmosphere. And then, post-heat-treating is performed at high temperature of 2000-2100° C. to prepare the high purity silicon carbide powders.

However, the method of the patent document 1 is complex and complicated because a halogen compound has to be added during every step of heat treatment process to achieve high purity of synthesized SiC powders and the post-heat treatment process consists of repeated heat treatments at high temperature of 2000-2100° C. or higher for 2 or more times.

Korean Patent Registration No. 10-1084711 (patent document 2), which has been recently reported, discloses a method of preparing high-purity fine silicon carbide powders prepared by the following steps: performing gelation of a mixture of a silicon source and a carbon source by using an aqueous acid solution, pulverizing the mixture, which is in a gel-like form, adding silicon powders, and then conducting carbothermal reduction at 1250-1600° C.

Korean Patent Registration No. 10-1116755 (patent document 3) proposes a method of preparing β-phase silicon carbide-carbon-silica (β-SiC/C/$SiO_2$) composite powders. According to the method, the silicon carbide precursor powders consisting of silica ($SiO_2$) and carbon are prepared by heat treating hardened gel powders, in which a mixture of a silicon course and a carbon source is subjected to a gelation and then hardened, and then β-phase silicon carbide-carbon-silica (β-SiC/C/$SiO_2$) composite powders are prepared by conducting heat treatment at the temperature of 1300-1600° C.

And, Korean Patent Publication No. 10-2014-0049664 (patent document 4) proposes a method of preparing α-phase silicon carbide granular powders. Fine β-phase silicon carbide powder agglomerates are prepared by a spraying process with an organic solvent using fine β-phase silicon carbide powders synthesized by a carbothermal reduction process. And then, α-phase silicon carbide granular powders are prepared by heat-treating the prepared fine silicon carbide powder agglomerates, at 2000-2200° C. The method for preparing high-purity α-phase silicon carbide granular powders proposed in the patent document 4 has the problems that it requires heat treatment at high temperature of 2000-2200° C. under a vacuum or inert gas atmosphere for a long time and the production cost is high because it involves multiple heat treatment steps at high temperature.

Because it is difficult to prepare granular silicon carbide powders economically with the existing methods described above, process improvement is necessary to enable economical preparation of high-purity granular silicon carbide powders at lower temperatures with high reliability.

REFERENCES OF THE RELATED ART

Patent Documents (Patent document 1) Korean Patent Registration No. 10-0338849.
(Patent document 2) Korean Patent Registration No. 10-1084711.
(Patent document 3) Korean Patent Registration No. 10-1116755.
(Patent document 4) Korean Patent Publication No. 10-2014-0049664.

SUMMARY

An object of the present invention is to solve the problems of the existing fabrication methods for preparing silicon carbide granular powders described above, i.e., high production cost due to heat treatment at high temperature, complicated preparation process, and the need to improve the yield and purity of the silicon carbide granular powder.

The present invention is directed to providing a method for preparing high-purity β-phase silicon carbide granular powders with narrow particle size distribution and a low concentration of impurities with a high yield by using porous silicon dioxide-carbon composite powders (hereinafter, porous $SiO_2$—C composite powders) having uniformly distributed carbon source therein and having a high specific surface area. High-purity β-phase silicon carbide granular powders are prepared by a heat treatment process in which both direct reaction between carbon (C∈) and metallic silicon(Si) and carbothermal reduction between carbon (C) and silicon dioxide ($SiO_2$) occur at the same time.

The present invention is also directed to providing high-purity β-phase silicon carbide granular powders prepared by the method.

The present invention is also directed to providing porous $SiO_2$—C composite powders which is used in preparation of β-phase silicon carbide powders, have carbon sources uniformly distributed therein and has a high specific surface area, and a method for preparing the same.

In an aspect, the present invention provides a method for preparing porous $SiO_2$—C composite powders for preparation of β-phase silicon carbide powders, including:

i) a step of preparing a gel wherein a carbon compound is dispersed in the network structure of silicon dioxide by mixing a silicon compound and a carbon compound in liquid state and conducting hydrolysis and gelation via a sol-gel process; and ii) a step of preparing a porous $SiO_2$—C composite by allocating the carbon compound uniformly dispersed in the gel as a solid state, drying the gel and then heat-treating the dried gel at 600-1000° C.

In another aspect, the present invention provides a method for preparing β-phase silicon carbide granular powders with high purity, including:

i) a step of preparing a gel wherein carbon compounds are uniformly dispersed in the network structure of silicon dioxide by mixing a silicon compound and a carbon compound in liquid state and conducting hydrolysis and gelation via a sol-gel process;

ii) a step of preparing porous $SiO_2$—C composite powders by allocating the carbon compound uniformly dispersed in the gel as a solid state, drying the gel and then heat-treating the dried gel at 600-1000° C.; and iii) a step of preparing β-phase silicon carbide powders by, after adding metallic silicon to the porous $SiO_2$—C composite powders, conducting both a direct reaction and carbothermal reduction at the same time among carbon, metallic silicon, and silicon dioxide, wherein the step of the preparation includes first heat treatment of heating to 1200-1400° C. at a heating rate of 1-20° C./min under an inert atmosphere or a vacuum atmosphere and second heat treatment of heating to 1500-1800° C. at a heating rate of 1-10° C./min under an inert atmosphere or a vacuum atmosphere.

In another aspect, the present invention provides porous $SiO_2$—C composite powders for preparation of β-phase silicon carbide powders which have a specific surface area of 10 m²/g or greater and has a mesoporous pore structure with an average pore size of 500 nm or smaller.

In another aspect, the present invention provides high-purity β-phase silicon carbide granular powders which have an average particle size of 20-300 μm and a particle size distribution ($d_{90}/d_{10}$) of 5 or smaller and contains 5 ppm or less of impurities.

In accordance with the preparation method of the present invention, a high-purity β-phase silicon carbide granular powder having an average particle size of 20-300 μm and a uniform particle size distribution ($d_{90}/d_{10}$) of 5 or smaller and containing 5 ppm or less of metal impurities can be prepared at low temperature of 1800° C. or below. Accordingly, the operation life time of a high-purity graphite heating element and a graphite insulator in a vacuum graphite furnace can be extended.

Also, in accordance with the preparation method of the present invention, it is possible to effectively control the particle size, particle size distribution and purity of the prepared silicon carbide powders by varying a ratio of the silicon source to carbon source, which are used for preparing the porous $SiO_2$—C composite powders, and controlling heating rate and heating treatment temperature in the process of thermally treating the porous $SiO_2$—C composite powders with the added metallic silicon, in which the thermal treatment comprises the direct reaction and carbothermal reduction.

In addition, the preparation method of the present invention enables the high-purity β-phase silicon carbide powders to be prepared with a high yield by thermally treating the porous $SiO_2$—C composite powders with the added metallic silicon. Accordingly, the reliability of the preparation process is improved and the production cost can be decreased. Consequently, the production cost of a silicon carbide single crystal wafer for manufacturing a power semiconductor can be decreased.

DETAILED DESCRIPTION

The present invention discloses porous silicon dioxide-carbon ($SiO_2$—C) composite powders with a high specific surface area, in which a carbon source is uniformly distributed, prepared by using a silicon compound and a carbon compound in a liquid state as raw materials, and a method for preparing the same. The present invention also discloses high-purity β-phase silicon carbide granular powders prepared by conducting both direct reaction and carbothermal reduction at the same time among carbon, metallic silicon, and silicon dioxide via a two-step heat treatment process of the porous silicon dioxide-carbon ($SiO_2$—C) composite powders with the added metallic silicon at specific heating rate and heating temperature, and a method for preparing the same.

The method for preparing porous silicon dioxide-carbon ($SiO_2$—C) composite powders and the method for preparing β-phase silicon carbide granular powders according to the present invention includes the following steps:

i) a step of preparing a gel wherein a carbon compound is uniformly dispersed in the network structure of silicon dioxide by mixing a silicon compound and a carbon compound in liquid state and conducting hydrolysis and gelation via a sol-gel process;

ii) a step of preparing porous $SiO_2$—C composite powders by allocating the carbon compound uniformly dispersed in the gel as solid state, drying the gel and then heat-treating the dried gel at 600-1000° C.; and iii) a step of preparing β-phase silicon carbide powders by, after adding metallic silicon to the porous $SiO_2$—C composite powders, conducting both direct reaction and carbothermal reduction at the same time among carbon, the metallic silicon, and silicon dioxide including first heat treatment of heating to 1200-1400° C. at a heating rate of 1-20° C./min under an inert atmosphere or a vacuum atmosphere and second heat treatment of heating to 1500-1800° C. at a heating rate of 1-10° C./min under an inert atmosphere or a vacuum atmosphere.

Hereinafter, an exemplary embodiment of the present invention will be described in more detail.

In the step i) of the present invention, a silicon compound and a carbon compound in liquid state are used as starting raw materials. After mixing the starting raw materials, a gel, wherein the carbon compound is uniformly dispersed in the network structure of silicon dioxide, is prepared via a sol-gel process by hydrolyzing the silicon compound by adding an aqueous acid or base solution in liquid state.

In a specific exemplary embodiment of the present invention, raw materials for synthesizing high-purity β-phase silicon carbide granular powders at low temperature may have a low content of metallic elements, such as Fe, Cu, Ni, Na, Ca and Cr, which are impurities to be introduced into the semiconductor during the high-temperature process.

Specifically, as the starting raw materials, a silicon compound and a carbon compound containing 0.1 wt % or less of metal impurities may be used. Specifically, as the metallic silicon used for the direct reaction with carbon during the heat treatment process, a silicon metal powder or a silicon metal piece having a purity of 99.999 wt % or higher may be used.

In a specific exemplary embodiment of the present invention, the liquid silicon compound may be one or more selected from silicon mono($C_1$-$C_4$ alkoxide), silicon di($C_1$-$C_4$ alkoxide), silicon tri($C_1$-$C_4$ alkoxide), silicon tetra($C_1$-$C_4$ alkoxide) and polyethyl silicate. Specifically, the silicon compound may be silicon tetraethoxide (also known as tetraethyl orthosilicate) and the carbon compound may be a novolac-type phenol resin.

In a specific exemplary embodiment of the present invention, the carbon compound may be one or more selected from a high-purity phenol resin and a polysaccharide. Specifically, the carbon compound may be one or more selected from a novolac-type phenol resin, sucrose, maltose and lactose.

In a specific exemplary embodiment of the present invention, when mixing the starting raw materials, the silicon compound and the carbon compound in liquid state may be mixed such that the molar ratio of carbon/silicon (C/Si) in the porous $SiO_2$—C composite powders is within a range of 1.6-4.0. The particle size of the prepared silicon carbide powders is increased as the molar ratio of C/Si is increased. When the molar ratio of C/Si is smaller than 1.6, a yield of the synthesized silicon carbide powders may be decreased significantly. And, when the molar ratio of C/Si exceeds 4.0, the synthesized silicon carbide powders may have a broad particle size distribution due to an increase in the synthesis of fine silicon carbide particles as a result of a direct reaction between the excess carbon source and the metallic silicon. Accordingly, it is recommended to maintain the above-described molar ratio of carbon/silicon in the porous $SiO_2$—C composite powders. The starting raw materials may be stirred at room temperature to 60° C. at a stirring speed of 200-400 rpm to prepare a homogeneous liquid sol.

In a specific exemplary embodiment of the present invention, a solvent used for dissolving the starting materials may be water, alcohol or an aqueous alcohol solution, in which the solvent may be used in a ratio of 1 mol of the liquid silicon compound to 10 mol or less, preferably 1 to 5 mol. Specifically, the solvent may be water, methanol, ethanol, an aqueous methanol solution or an aqueous ethanol solution. And, in order to ensure uniform mixing of the starting raw materials and prevent inclusion of impurities, a Teflon-coated mixing device in which impurities of metals or metal compounds are little, e.g., a Teflon container, a Teflon-coated magnetic mixing device, a Teflon-coated appliance, a stirring device using a Teflon-coated impeller, etc., may be used.

In a specific exemplary embodiment of the present invention, when mixing and stirring the starting raw materials, the aqueous acid or base solution is added as a catalyst for hydrolysis and gelation of the silicon compound. The aqueous acid or base solution may be prepared such that the molar ratio of the acid or base is 0.2 or smaller, specifically 0.01-0.2, and the molar ratio of water is 10 or smaller, specifically 1-10, based on the silicon (Si) element in the silicon compound.

In a specific exemplary embodiment of the present invention, the acid or base is used as the catalyst for hydrolysis and gelation of the silicon compound. The acid may be one or more selected from nitric acid, hydrochloric acid, oxalic acid, maleic acid, acrylic acid, acetic acid and toluenesulfonic acid. And the base may be one or more selected from ammonia water, hexamethylenetetramine and an alkali metal hydroxide (typically sodium hydroxide).

In the step ii) of the present invention, porous $SiO_2$—C composite powders are prepared by allocating the carbon compound uniformly dispersed in the gel as solid state, drying the gel and then heat-treating the dried gel at 600-1000° C.

In a specific exemplary embodiment of the present invention, the carbon compound is allocated into a gel as a solid state, dried to maintain a pore structure of silicon compound, and then thermally treated at 600 to 1000° C. for 0.5 to 3 hours under an inert atmosphere or a vacuum atmosphere so as to prepare porous silicon dioxide-carbon ($SiO_2$—C) composite powders. Accordingly, the network structure comprising silicon dioxide, which constitutes the gel, the pore structure of the network structure, and the carbon source uniformly dispersed in the pore structure remain in the prepared porous silicon dioxide-carbon ($SiO_2$—C) composite powders.

In a specific exemplary embodiment of the present invention, the carbon compound dispersed in the gel may be allocated as solid state via a process of removing the solvent. The solvent may be removed by a commonly employed method. Specifically, the solvent may be removed by evaporation, distillation under reduced pressure, freeze-drying, dilution, etc. The method for removing the solvent is not particularly limited in the present invention.

In a specific exemplary embodiment of the present invention, the carbon compound dispersed in the gel may be allocated as a solid state via a process of precipitating by adding a non-solvent. The non-solvent (poor solvent) may be any solvent such as water which does not dissolve the carbon compound used in the step of preparing the gel. The non-solvent is not particularly limited in the present invention.

In a specific exemplary embodiment of the present invention, after the carbon compound dispersed in the gel is allocated as a solid state, drying is conducted to maintain the pore structure. The drying may be conducted at 40-150° C. for 1-48 hours.

In a specific exemplary embodiment of the present invention, in the step ii), the prepared porous $SiO_2$—C composite powders may be further pulverized and classified to a size of 0.05-5 mm.

The prepared porous $SiO_2$—C composite powders may have a specific surface area of 10 $m^2$/g or larger, specifically 50-200 $m^2$/g, and may have a mesoporous pore structure with an average pore size of 500 nm or smaller, specifically 10-500 nm. Specifically, the prepared porous $SiO_2$—C composite powders may be used as a raw material for preparation of β-phase silicon carbide granular powders according to the present invention.

In the step iii) of the present invention, β-phase silicon carbide powders are prepared by both direct reaction and carbothermal reduction at the same time among carbon, metallic silicon, and silicon dioxide. The direct reaction and carbothermal reduction are conducted in a high-purity graphite crucible in which the mixture of the prepared porous $SiO_2$—C composite powders containing uniformly distributed carbon and the metallic silicon are loaded.

In a specific exemplary embodiment of the present invention, after the mixture of the porous $SiO_2$—C composite powders and the metallic silicon are loaded in a high-purity graphite vacuum furnace with a high packing density ultra high-purity β-phase silicon carbide granular powders having a narrow particle size distribution and various average particle sizes may be prepared via a two-step heat treatment process under an inert atmosphere of nitrogen or argon or under a vacuum (10° torr or lower) by controlling the heating rate and varying the heat treatment temperature.

In a specific exemplary embodiment of the present invention, silicon carbide granular powders are prepared by adding the metallic silicon in an amount of 60 mole % or more, specifically 60-200 mole, based on the amount of carbon (C) remaining in the porous $SiO_2$—C composite powders, conducting heat treatment such that both direct reaction and carbothermal reduction among the metallic silicon, silicon dioxide, and carbon (C) occur and facilitating the growth of the synthesized silicon carbide particles In a specific exemplary embodiment of the present invention, the heat treatment for preparing the ultrahigh-purity silicon carbide granular powders may include two step processes: a first heat treatment process of heating to 1200-1400° C. at a heating rate of 1-20° C./min under an inert atmosphere or a vacuum atmosphere for 1 to 10 hours, and a second heat treatment process of heating to 1500-1800° C. at a heating rate of 1-10° C./min for 0.5 to 5 hours.

In accordance with the present invention, direct reaction between the metallic silicon and the unreacted carbon, carbothermal reduction between the unreacted silicon dioxide and the unreacted carbon, and carbothermal reduction between gaseous silicon monoxide produced from the reaction between the metallic silicon and the unreacted silicon dioxide and the unreacted carbon occur in the vacuum furnace and, at the same time, the growth of the synthesized silicon carbide powder particle occurs. As a result, the ultrahigh-purity β-phase silicon carbide granular powders are prepared. Specifically, the metallic silicon that may remain in the prepared ultrahigh-purity β-phase silicon carbide granular powders may be removed using a mixture of nitric acid and hydrofluoric acid.

In a specific exemplary embodiment of the present invention, the prepared ultrahigh-purity β-phase silicon carbide granular powders may have an average particle size of 20-300 μm, a particle size distribution ($d_{90}/d_{10}$) of 5 or smaller, impurities in an amount of 5 ppm or less, and a purity of 99.9995 wt % or higher.

As described, in accordance with the present invention, high-purity β-phase silicon carbide granular powders having a narrow particle size distribution and containing controlled impurities may be prepared at low temperature using a liquid-state silicon compound and a liquid-state carbon compound with high purity as starting raw materials.

Also, in accordance with the present invention, porous $SiO_2$—C composite powders having a mesoporous pore structure with a large specific surface area and having high reactivity is prepared by preparing a gel wherein a carbon compound is uniformly dispersed in the network structure of a silicon dioxide via a sol-gel process, allocating the carbon compound in the prepared gel as solid state by removing a solvent and then conducting drying and heat treatment, and ultra-high-purity β-phase silicon carbide granular powders may be prepared using the same.

In accordance with the present invention, high-purity β-phase silicon carbide granular powders can be synthesized with a high yield at low temperature by conducting both the direct reaction and carbothermal reduction of the porous $SiO_2$—C composite powders with the added metallic silicon.

In accordance with the present invention, high-purity β-phase silicon carbide granular powders can be prepared at 1800° C. or below and the size of the synthesized silicon carbide powders can be controlled effectively by varying a ratio of the silicon source to carbon source, which are used for preparing the porous $SiO_2$—C composite powders, heating rate, heating temperature and heating time during the process of heat treatment.

Also, in accordance with the present invention, because high-purity β-phase silicon carbide granular powders having a particle size of 100 μm or greater can be synthesized via a simple heat treatment process even at 1800° C. or below, the reliability of the synthesis process for high-purity β-phase silicon carbide granular powders can be significantly improved and the operation life time of a high-purity graphite heating element and a graphite insulator in a vacuum graphite furnace can be extended. Since these advantages in terms of the synthesis process lead to decreased production cost of the ultrahigh-purity silicon carbide powders, the production cost of a silicon carbide single crystal wafer for the manufacturing of a power semiconductor using the existing physical vapor transport (PVT) method can be decreased.

EXAMPLES

The present invention will be described in more detail through examples.

However, the present invention is not limited by the examples.

Examples 1-4

For preparation of high-purity β-phase silicon carbide granular powders, tetraethyl orthosilicate (TEOS) containing 20 ppm or less of metal impurities was used as a liquid-state silicon source and a solid state-phenol resin (novolac-type) containing 100 ppm of metal impurities was used as a carbon source. The amounts of the TEOS and the phenol resin were determined such that the molar ratio of the carbon and the silicon (C/Si) in the prepared porous $SiO_2$—C composite powders was 1.6-4.0 considering the carbon remaining after heat treatment.

In a Teflon-coated container equipped with a Teflon-coated stirring impeller, the carbon source and the silicon source were mixed and stirred in the ratio of Table 1. Specifically, the phenol resin as the carbon source was dissolved in ethanol. A molar ratio of the ethanol to the silicon element of the silicon source is 4:1. And then the dissolved phenol resin was mixed sufficiently by stirring at room temperature at the speed of 400 rpm after adding the TEOS as the silicon source. After adding an aqueous nitric acid in the reactant mixture, in which 0.07 mol ratio of nitric acid and 2 mol ratio of water based on the silicon (Si) element of the silicon source are mixed, to the sufficiently mixed starting raw material solution, the mixture was stirred at room temperature until a gel was formed. The prepared gel was treated to allocate the phenol resin uniformly distributed in the gel as solid state. To allocate the phenol resin dispersed in the gel as solid state, the solvent was evaporated or a non-solvent, such as water, was added. After the phenol resin dispersed in the gel was allocated as solid state, the gel was dried at 80° C. for 24 hours to remove excess liquid remaining in the gel. The dried gel was put in a high-purity graphite crucible and, after loading in a quartz reactor, was heat-treated under a nitrogen gas atmosphere at 1000° C. for 0.5 hour by heating at a rate of 5° C./min to prepare porous silicon dioxide-carbon ($SiO_2$—C) composite. The prepared porous $SiO_2$—C composite was pulverized to a particle size of 300 μm or smaller and then heat-treated to prepare β-phase silicon carbide granular powders.

After adding 110 mole % of metallic silicon (average particle size=5 mm, purity=99.999 wt % or higher) based on the carbon in the porous $SiO_2$—C composite to the porous $SiO_2$—C composite powders, the mixture of the porous $SiO_2$—C composite powders and the added metallic silicon was put in a high-purity graphite crucible at a packing density of 60% and, after loading in a graphite vacuum furnace, high-purity β-phase silicon carbide granular powders were synthesized via a two-step heat treatment process consisting of first heat treatment of heating to 1350° C. under a vacuum atmosphere at a heating rate of 10° C./min and maintaining at the temperature for 3 hours and second heat treatment of heating to 1700° C. under a vacuum atmosphere at a heating rate of 10° C./min and maintaining at the temperature for 1 hour.

The properties of the porous $SiO_2$—C composites powders and β-phase silicon carbide granular powders prepared in Examples 1-4 are summarized in Table 1.

TABLE 1

|  |  | Examples | | | |
|---|---|---|---|---|---|
|  |  | 1 | 2 | 3 | 4 |
| Starting raw materials | Carbon source (mol) | 1.6 | 2.3 | 3.0 | 4.0 |
|  | Silicon source (mol) | 1 | 1 | 1 | 1 |
|  | C/Si (molar ratio) | 1.6 | 2.3 | 3.0 | 4.0 |
| Aqueous nitric acid solution | Nitric acid (mol) | 0.07 | 0.07 | 0.07 | 0.07 |
|  | Water (mol) | 2 | 2 | 2 | 2 |
| Porous $SiO_2$—C composite powders | Specific surface area (m²/g) | 5 | 33.9 | 124.8 | 181 |
|  | Average pore | 13.7 | 5 | 4.8 | 4.15 |

TABLE 1-continued

|  |  | Examples | | | |
|---|---|---|---|---|---|
|  |  | 1 | 2 | 3 | 4 |
| β-SiC powders | size (nm) Average particle size (μm) | 40-100 | | | |
|  | Particle size distribution | 1.2-1.5 | | | |
|  | Purity (wt %) | 99.9995-99.9998 | | | |

As seen from Table 1, the prepared porous $SiO_2$—C composite powders had a specific surface area of 5-200 m²/g and an average pore size of about 4-15 nm.

And, the β-phase silicon carbide granular powders prepared using the porous $SiO_2$—C composite powders with the added metallic silicon had an average particle size of 40-100 μm. The average particle size of the silicon carbide powders were increased with increasing the C/Si molar ratio in the porous $SiO_2$—C composite powders, and the particle size distribution ($d_{90}/d_{10}$) of the prepared β-phase silicon carbide powders was narrow as 1.2-1.5. From GDMS analysis the prepared β-phase silicon carbide powders had an ultrahigh purity of 99.9995-99.9998 wt % and contained trace amounts of Fe and Na as main impurities.

Examples 5-6

A porous $SiO_2$—C composite was prepared in the same manner as in Example 1. The porous $SiO_2$—C composite was pulverized to a size of 200 μm and then heat-treated to prepare a β-phase silicon carbide granular powder.

After adding 150 mole % of metallic silicon (average particle size=5 mm, purity=99.999 wt %) based on the carbon in the porous $SiO_2$—C composite to the porous $SiO_2$—C composite powders, the mixture of the porous $SiO_2$—C composite powders and the added metallic silicon was put in a high-purity graphite crucible at a packing density of 60% and, after loading in a graphite vacuum furnace, and high-purity β-phase silicon carbide granular powders were synthesized via a two-step heat treatment processes consisting of first heat treatment of heating to 1350° C. under a vacuum atmosphere at a heating rate of 10° C./min for 3 hours and second heat treatment of heating to 1800° C. under a vacuum atmosphere at a heating rate of 2° C./min or 10° C./min for 3 hours.

The properties of the β-phase silicon carbide granular powders prepared in Examples 5-6 are summarized in Table 2.

TABLE 2

|  |  | Examples | |
|---|---|---|---|
|  |  | 5 | 6 |
| First heat treatment | Atmosphere | Vacuum | Vacuum |
|  | Heating rate (° C./min) | 10 | 10 |
|  | Highest temperature (° C.) | 1350 | 1350 |
|  | Heating time (hr) | 3 | 3 |
| Second heat treatment | Atmosphere | Vacuum | Vacuum |
|  | Heating rate (° C./min) | 2 | 10 |
|  | Highest temperature (° C.) | 1800 | 1800 |
|  | Heating time (hr) | 3 | 3 |
| β-SiC powder | Average particle size (μm) | 100-150 | 90-150 |
|  | Particle size distribution | 4.5-4.7 | about 5 |
|  | Purity (wt %) | 99.9997 | 99.9999 |

Examples 7-8

Porous $SiO_2$—C composite powders were prepared in the same manner as in Example 1. The porous $SiO_2$—C composite was pulverized to a size of 500 μm and then heat-treated to prepare a β-phase silicon carbide granular powder.

The high-purity β-phase silicon carbide granular powders were synthesized in accordance with the following steps: Adding 180 mole % of metallic silicon (average particle size=5 mm, purity=99.999 wt %) based on the carbon in the porous $SiO_2$—C composite to the porous $SiO_2$—C composite powders; putting the mixture of the porous $SiO_2$—C composite powders and the added metallic silicon into a high-purity graphite crucible at a packing density of 60%; loading into a graphite vacuum furnace; and then conducting the process of the two-step heat treatment under a vacuum atmosphere ($10^{-2}$ torr), wherein the first heat treatment was conducted by heating to 1400° C. at a heating rate of 10° C./min under a vacuum atmosphere for 3 hours, and the second treatment was conducted by heating to 1700° C. or 1800° C. at a heating rate of 10° C./min under a vacuum atmosphere for 3 hours such that the high-purity β-phase silicon carbide granular powders were prepared.

The properties of the β-phase silicon carbide granular powders prepared in Examples 7-8 are summarized in Table 3.

TABLE 3

|  |  | Examples | |
|---|---|---|---|
|  |  | 7 | 8 |
| First heat treatment | Atmosphere | Vacuum | Vacuum |
|  | Heating rate (° C./min) | 10 | 10 |
|  | Highest temperature (° C.) | 1400 | 1400 |
|  | Heating time (hr) | 3 | 3 |
| Second heat treatment | Atmosphere | Vacuum | Vacuum |
|  | Heating rate (° C./min) | 10 | 10 |
|  | Highest temperature (° C.) | 1700 | 1800 |
|  | Heating time (hr) | 3 | 3 |
| β-SiC powders | Average particle size (μm) | 150-200 | 130-170 |
|  | Particle size distribution | 1.5-1.8 | 1.1-1.3 |
|  | Purity (wt %) | 99.9999 | 99.99992 |

Figure 1:
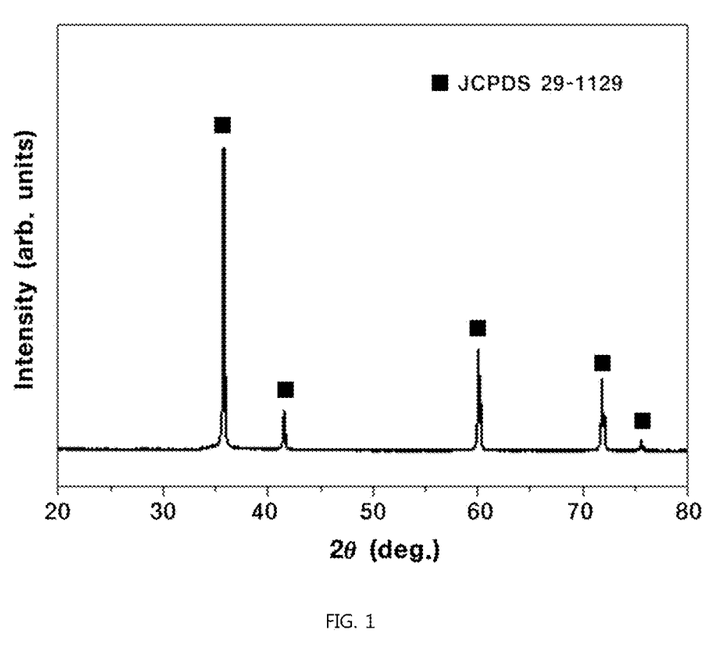
FIG. 1 shows a result of the X-ray diffraction pattern of high-purity β-phase silicon carbide granular powders prepared according to the present invention.

An X-ray diffraction pattern of the high-purity β-phase silicon carbide granular powders prepared in Example 7 is shown in FIG. 1.

Examples 9-11

A porous $SiO_2$—C composite was prepared in the same manner as in Example 1. The porous $SiO_2$—C composite was pulverized to a size of 1 mm and then heat-treated to prepare a β-phase silicon carbide granular powder.

After adding 150 mole % of metallic silicon (average particle size=5 mm, purity=99.999 wt %) based on the carbon in the porous $SiO_2$—C composite to the porous $SiO_2$—C composite powders, the mixture of the porous $SiO_2$—C composite powders and the added metallic silicon was put in a high-purity graphite crucible at a packing ratio of 60%, loaded into a graphite vacuum furnace, and then high-purity β-phase silicon carbide granular powders were synthesized via a two-step heat treatment process consisting of first heat treatment of heating to 1400° C. under a vacuum atmosphere at a heating rate of 10° C./min for 3 hours and second heat treatment of heating to the temperature described in Table 4 under a vacuum atmosphere at a heating rate of 2° C./min for the time period described in Table 4.

The properties of the β-phase silicon carbide granular powders prepared in Examples 9-11 are summarized in Table 4.

TABLE 4

|  |  | Examples | | |
|---|---|---|---|---|
|  |  | 9 | 10 | 11 |
| First heat treatment | Atmosphere | Vacuum | Vacuum | Vacuum |
|  | Heating rate (° C./min) | 10 | 10 | 10 |
|  | Highest temperature (° C.) | 1400 | 1400 | 1400 |
|  | Heating time (hr) | 3 | 3 | 3 |
| Second heat treatment | Atmosphere | Vacuum | Vacuum | Vacuum |
|  | Heating rate (° C./min) | 2 | 2 | 2 |
|  | Highest temperature (° C.) | 1800 | 1700 | 1700 |
|  | Heating time (hr) | 1 | 1 | 3 |
| β-SiC powder | Average particle size (μm) | 170-220 | 150-220 | |
|  | Particle size distribution | 1.5 | 2-3.5 | |
|  | Purity (wt %) | 99.99993 | 99.9999 | |

Figure 2:
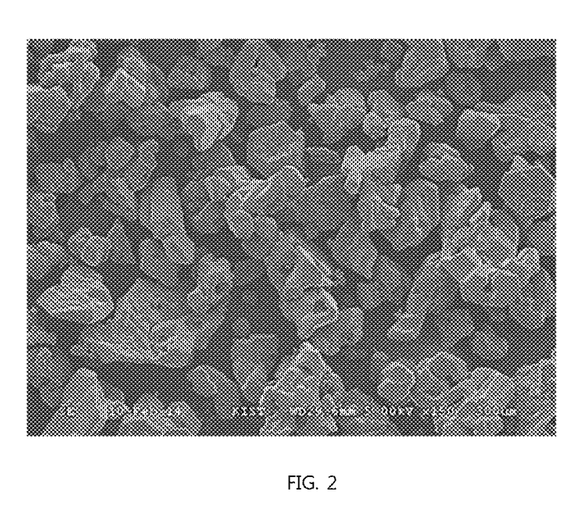
FIG. 2 is a scanning electron microscopic image (×150) of high-purity β-phase silicon carbide granular powders prepared according to the present invention.

A scanning electron microscopic image of the high-purity β-phase silicon carbide granular powder prepared in Example 11 is shown in FIG. 2.

The β-phase silicon carbide granular powders according to the present invention can be used as a raw material for the preparation of silicon carbide single crystals and high-purity silicon carbide components for semiconductors manufacturing process.

What is claimed is:

1. A method for preparing β-phase silicon carbide granular powders, the method comprising:
    i) preparing a gel wherein a carbon compound is uniformly dispersed in the network structure of silicon dioxide by mixing a silicon compound and a carbon compound in liquid state and conducting hydrolysis and gelation via a sol-gel process;
    ii) preparing a porous $SiO_2$—C composite by allocating the carbon compound uniformly dispersed in the gel as solid state, drying the gel and then heat-treating the dried gel at 600-1000° C.; and
    iii) preparing β-phase silicon carbide granular powders by, after adding metallic silicon to the porous $SiO_2$—C composite powders, conducting both direct reaction and carbothermal reduction among carbon, metallic silicon, and silicon dioxide,
    wherein the direct reaction and carbothermal reduction comprise a first heat treatment of heating to 1200 to 1400° C. at a heating rate of 1-20° C./min under an inert atmosphere or a vacuum atmosphere and a second heat treatment of heating to 1500 to 1800° C. at a heating rate of 1-10° C./min under an inert atmosphere or a vacuum atmosphere.

2. The method for preparing β-phase silicon carbide granular powders according to claim 1,
    wherein, in i), a gel, in which a carbon compound is uniformly dispersed in the network structure of silicon dioxide, is prepared by forming a liquid sol by mixing and stirring the liquid state silicon compound and the liquid state carbon compound, then adding an aqueous acid or base solution that facilitates hydrolysis and gelation of the silicon compound.

3. The method for preparing β-phase silicon carbide granular powders according to claim 2,
    wherein a homogeneous liquid sol is formed by mixing the liquid state silicon compound and the liquid state carbon compound such that the molar ratio of carbon/silicon (C/Si) in the porous $SiO_2$—C composite is within a range of 1.6-4.0 and then stirring the same at room temperature to 60° C. at a stirring speed of 200-400 rpm.

4. The method for preparing β-phase silicon carbide granular powders according to claim 2,
    wherein the aqueous acid or base solution is prepared such that the molar ratio of the acid or base is 0.2 or smaller and the molar ratio of water is 10 or smaller based on the silicon (Si) element in the silicon compound.

5. The method for preparing β-phase silicon carbide granular powders according to claim 2,
    wherein the acid is one or more selected from nitric acid, hydrochloric acid, oxalic acid, maleic acid, acrylic acid, acetic acid and toluenesulfonic acid and the base is one or more selected from ammonia water, hexamethylenetetramine and an alkali metal hydroxide.

6. The method for preparing β-phase silicon carbide granular powders according to claim 1,
    wherein, the silicon compound used in i) is one or more silicon source selected from silicon mono ($C_1$-$C_4$ alkoxide), silicon di($C_1$-$C_4$ alkoxide), silicon tri($C_1$-$C_4$ alkoxide), silicon tetra($C_1$-$C_4$ alkoxide) and polyethyl silicate, and the carbon compound used in i) is one or more carbon source selected from a disaccharide selected from sucrose, maltose and lactose and a phenol resin.

7. The method for preparing β-phase silicon carbide granular powders according to claim 1,
    wherein, in ii), the carbon compound uniformly dispersed in the gel is allocated as solid state via a process of removing a solvent or via a process of precipitating by adding a non-solvent and the drying is conducted at 40-150° C. for 1-48 hours such that a pore structure with the carbon compound allocated as solid state is maintained.

8. The method for preparing β-phase silicon carbide granular powders according to claim 1,
    wherein, in ii), the prepared porous $SiO_2$—C composite is further pulverized and classified to a size of 0.05-5 mm.

9. The method for preparing β-phase silicon carbide granular powders according to claim 1,
    wherein, in iii), ultrahigh-purity β-phase silicon carbide granular powders having a narrow particle size distribution and various average particle sizes is prepared by controlling the heating rate and varying the heat treatment temperature and time.

10. The method for preparing β-phase silicon carbide granular powders according to claim 9,
    wherein, in iii), ultrahigh-purity β-phase silicon carbide granular powders having an average particle size of 20-300 μm, a uniform particle size distribution ($d_{90}$/$d_{10}$) of 5 or smaller and a purity of 99.9995 wt % or higher is prepared.

11. The method for preparing β-phase silicon carbide granular powders according to claim 1,
    wherein, in iii), the metallic silicon is added in an amount of 60-200 mole % based on the amount of carbon in the porous $SiO_2$—C composite powders.

12. The method for preparing β-phase silicon carbide granular powders according to claim 1, wherein the porous $SiO_2$—C composite powders prepared in ii) has a specific surface area of 10 m$^2$/g or larger and has a pore structure with an average pore size of 10-500 nm.

13. High-purity β-phase silicon carbide granular powders which are prepared by the method according to claim 1 and has an average particle size of 20-300 μm, a particle size distribution ($d_{90}/d_{10}$) of 5 or smaller and a purity of 99.9995 wt % or higher.

* * * * *